United States Patent [19]

Metelski

[11] Patent Number: 4,577,913
[45] Date of Patent: Mar. 25, 1986

[54] WRAPAROUND SUPPORT FOR A LINEARLY GUIDED SLIDE

[75] Inventor: Andrezej Metelski, Romanshorn, Switzerland

[73] Assignee: Hydrel AG, Romanshorn, Switzerland

[21] Appl. No.: 618,172

[22] Filed: Jun. 7, 1984

[30] Foreign Application Priority Data

Jun. 10, 1983 [CH] Switzerland ............. 3212/83

[51] Int. Cl.[4] ............................................. F16C 29/04
[52] U.S. Cl. ..................................... 308/6 R; 308/6 C
[58] Field of Search ............ 308/6 R, 6 C, 3 R, 3 A

[56] References Cited

U.S. PATENT DOCUMENTS 4,348,064 9/1982 Teramachi ............ 308/6 C
4,427,240 1/1984 Teramachi ............ 308/6 C
4,433,876 2/1984 Mottate .................. 308/6 R

FOREIGN PATENT DOCUMENTS 2812034 9/1979 Fed. Rep. of Germany .
1460061 10/1965 France .

Primary Examiner—Lenard A. Footland
Attorney, Agent, or Firm—Blum Kaplan Friedman Silberman & Beran

[57] ABSTRACT

A wraparound support for linearly guiding a slide along a guide bar. The guide bar has upper, lower and side guide surfaces. The support includes bearing members slidably coupled to the upper and lower guide surfaces. The slide is coupled to the bearing unit slidably coupled to the upper guide surface. A carrier member comprises a bottom carrier member, a side carrier member coupled to the bottom carrier member and a biasing member for biasing the carrier member and the slide together. The side carrier member maintains the bottom carrier member and the slide in spaced relation. The bottom carrier member is slidably coupled to the lower guide surface by the bearing units.

10 Claims, 4 Drawing Figures

WRAPAROUND SUPPORT FOR A LINEARLY GUIDED SLIDE

BACKGROUND OF THE INVENTION

The invention relates generally to a support for a sliding linear guide and in particular to a sliding linear guide support which wraps around a fixed guiding bar.

Prior art sliding linear guides supports have been designed with an L profile. The two legs of the L profile form the first and second carrier of the support. The tensional force applied to the support tends to be applied to the shorter leg of the L profile which causes both legs to bend and result in the guide elements, e.g. rolling guides, being in a dangerously slanted position. This situation which must be avoided for the proper functioning of the linear guide can be prevented by building the L profile with larger dimensions. However, this solution has the disadvantage that considerble amounts of material must be used to avoid these problems and the resulting support is very large, heavy and expensive. Accordingly, there is a need for a wraparound support for a sliding linear guide which is compact and free from undesirable distortion and bending resulting from forces which are not completely vertically directed.

SUMMARY OF THE INVENTION

The invention is directed to a wraparound support for a linearly guided slide which moves in relation to fixed guide elements. The support consists of a first carrier which supports the tension produced by tension screws and transferred via a rolling guide element, attached to the first carrier, to a fixed guiding bar as well as of a second carrier which runs parallel to the direction of the tension and is supported by the sliding linear guide. The first and second carriers are separate elements. The second carrier includes a support which supports the first carrier and a spacer which does initially not support the first carrier but which contains the tension screws inserted between the supporting member and the guide elements. As a result of this configuration only normal forces are produced in the second carrier and the guide element of the first carrier. As a result there is no bending stress causing the guide elements to distort.

Accordingly, it is an object of the invention to provide an improved wraparound support for a linearly guided slide.

Another object of the invention is to provide a wraparound support for a linearly guided slide which is compact and free from distorting bending stress.

Yet another object of the invention is to provide a wraparound support for a sliding linear guide which is constructed so that all forces on the carrier are normal to the carrier members.

Still other objects and advantages of the invention will in part be obvious and will in part be apparent from the specification.

The invention accordingly comprises the features of construction, combinations of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
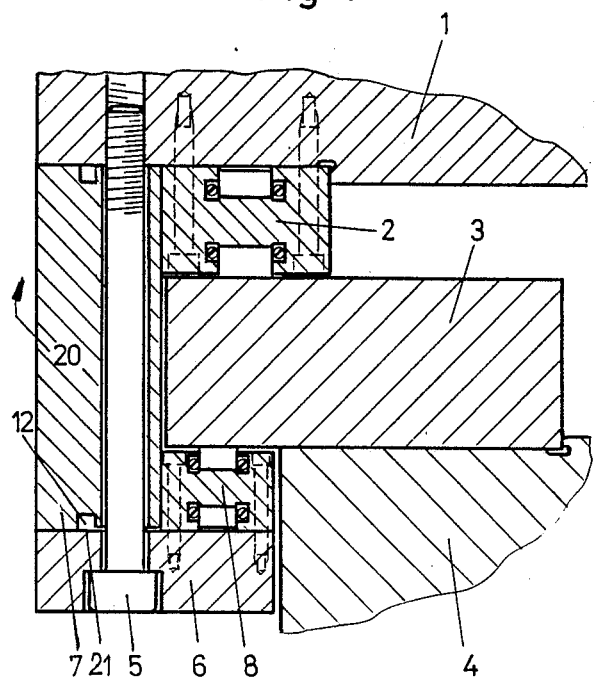
FIG. 1 is a partial sectional view of a wraparound support for a linearly guided slide constructed in accordance with the invention.

Reference is first made to FIG. 1 wherein a slide for a machine or device is supported by a first rolling guide element 2 and a guiding bar 3 on a bed 4 of the machine or device. Guiding bar 3 and bed 4 are fixed parts of the machine or device and do not move. Slide 1 moves relative to guiding bar 3 supported by first rolling guide element 2. However, to insure that slide 1 moves in a straight line a support member is needed. In the embodiment of FIG. 1 slide 1 is required to move perpendicular to the cross-sectional plane shown. To insure that slide 1 moves in a linear manner, additional support structure, generally indicated as 20 is utilized. Support structure 20 is generally composed of a first carrier 6 and a second carrier 7 with a second rolling guide element 8 attached to the first carrier 6. In order to exert a vertically oriented tension (FIG. 1) which keeps slide 1 level, slide 1 is attached to first carrier 6 with screws 5 (one screw is shown). A second carrier member 7 provides the opposing force to maintain second carrier 6 at a fixed distance from slide 1 in opposition to the tension provided by screws 5. Second carrier member 7 runs parallel to the direction of tension screws 5, i.e. the direction of the tension force. Second rolling guide element 8, which is attached to first carrier 6 underneath guiding bar 3 applies the force of the tension resulting from tightening tension screws 5 to guide bar 3. In this way slide 1 is evenly supported vertically on both sides of tension screws 5.

Figure 2:
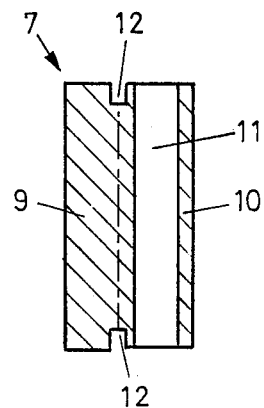
FIG. 2 is a cross-sectional view of the second carrier member of the wraparound support of FIG. 1.

Reference is next made to FIG. 2 wherein carrier member 7 is separately shown. Carrier 7 includes a support section 9, a spacer 10 and drilled holes 11. Support section 9 supports first carrier 6 against slide 1. Spacer 10 keeps tension screws 5 firmly in a perpendicular orientation so that the force provided by tension screws 5 is purely vertical. It is noted that spacer 10, to the right of a groove 12 does not extend down as far as support region 9. The effect of this is that spacer region 10 does not support any of the tension provided by tension screws 5. There is initially a resulting gap 21 between the bottom portion of spacer region 10 and the top of the carrier member 6 surrounding tension screws 5.

Carrier member 6 is stressed as a result of tension screws 6, which are installed between support member 9 of carrier 7 and rolling guide element 6 attached to carrier 6. Having achieved a desired tension in this system, the gap 21 may disappear, and the bottom spacer region 10 may support the top of carrier member 6 in its finally adjusted position. This configuration results in only normally directed forces occurring at support region 9 of carrier 7 and in rolling guide element 8. There is no bending strain. By shortening spacer 10 in carrier 7, which contains tension screws 5 in bore holes 11 any distortions in the position of rolling guide element 8 caused by bending in first carrier 6 will be compensated for. Support 9 and spacer 10 may be integrally formed as carrier 7 or may consist of separate units firmly attached to one another.

Figure 3:
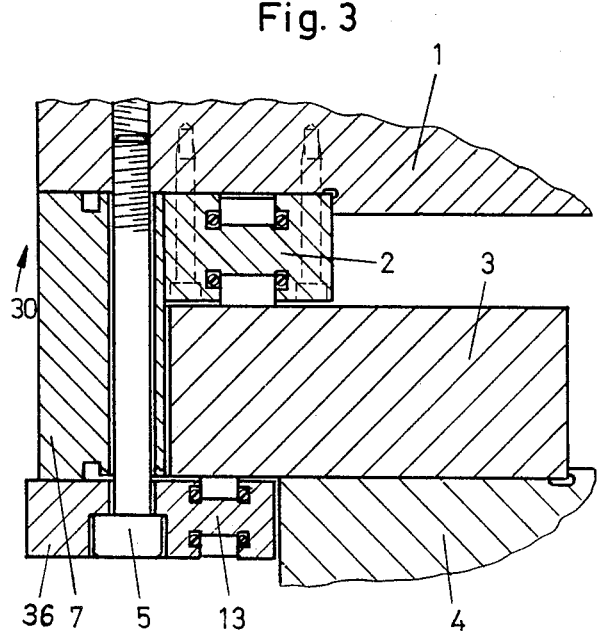
FIG. 3 is a cross-sectional view of another embodiment of the wraparound support constructed in accordance with the invention.

Reference is next made to FIG. 3 wherein a wraparound support, generally indicated as 30, constructed in accordance with another embodiment of the invention is depicted, like elements having like reference numerals. The difference between the embodiment of FIG. 3 and the embodiment of FIG. 1 is the incorporation of a lower rolling guide element 13 as a portion of a first carrier member 26. This configuration is particularly useful where vertical clearance is at a premium. In this configuration the height of rolling guide element 8 is eliminated.

Figure 4:
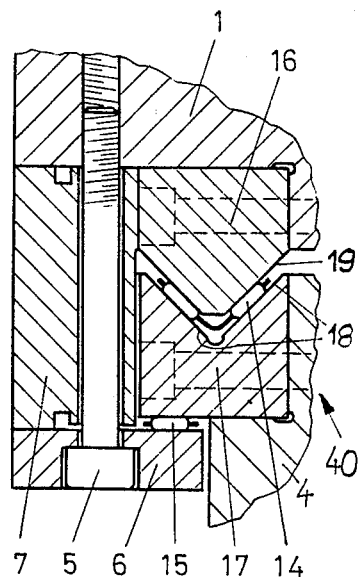
FIG. 4 is a cross-sectional view of a wraparound support constructed in accordance with another embodiment of the invention.

Reference is next made to FIG. 4 wherein a wraparound support, generally indicated as 40, constructed in accordance with another embodiment of the invention is depicted. Like parts are represented by like reference numerals. The embodiment of FIG. 4 differs from the embodiment of FIG. 1 in several important ways. Guiding bar 3 of FIG. 1 has been replaced by a stationary guide bar 17 having downwardly and inwardly angling sides 18. A prismatically shaped guide bar 16 is attached to slide 1. The bottom surface 19 is angled so as to be received within angled side 18 of guide bar 17. Surfaces 18, 19 are separated by a flat cage element 14 configured to allow guide bar 16 and slide 1 attached thereto to slide within surfaces 18 perpendicular to the cross-sectional plane of FIG. 4.

Carrier member 6 is designed to accommodate a flat cage element 15 between the upper surface of carrier member 6 and the lower surface of guide bar 17 to allow sliding perpendicular to the cross-sectional plane of FIG. 4. Flat cage element 15 replaces guide element 8 utilized in the embodiment of FIG. 1. In all other details the embodiment of FIG. 4 is the same as the embodiment of FIG. 1.

Accordingly, a wraparound support for a linearly guided slide, which is resistant to bending stress, is provided. The wraparound slide support is configured to insure that all forces exerted on the carrier members are exerted in a vertical direction which prevents bending of carrier members and allows for smooth contact between the rolling guide elements and the guide bars. In addition, the wraparound support can be made comparatively compact and without unnecessary complexity, weight or bulk without bending stresses affecting the linear operation of the slide.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A wraparound support for guiding an elongated slide along a stationary guide bar having a top face, a bottom face and a side face joining the top and bottom faces, comprising:

an upper guide member mounted to the bottom of the slide and having bearing means on the bottom side thereof for sliding along the top face of the guide bar;

an intermediate support member mounted to the bottom of the slide and adjacent to the upper guide member and positioned adjacent to the side face of the guide bar;

a lower guide member including bearing means on the upper surface thereof for sliding along the bottom face of the guide bar secured to the intermediate support member; and at least two tension screws mounted through the intermediate support member for applying tensional force between the upper and lower guide members;

the intermediate support member including a support portion and a spacer portion, the support portion being spaced apart from the side face for firmly coupling the lower guide member and the slide, the spacer portion being adjacent to side face and having openings therethrough adapted to receive the tension screws, the spacer portion defining an adjustable distance between the lower guide member and the slide where the tension screws pass from the lower guide member through the respective openings in the spacer portion of the intermediate support member, the adjustable distance being less than the distance between the lower guide member and the slide at the support portion of the intermediate member.

2. The wraparound support of claim 1, wherein the intermediate support member is maintained spaced apart from the side face of the guide bar.

3. The wraparound support of claim 1, wherein the lower guide member includes a lower support member including the bearing means.

4. The wraparound support of claim 1, including a gap between the spacer portion of the intermediate support member and the lower guide member.

5. The wraparound support of claim 1 wherein the support portion and the spacer portion of the immediate support member are integrally formed.

6. The wraparound support of claim 1, wherein lower guide member includes a lower support member and a lower bearing member including the bearing means said lower bearing means mounted on the upper surface of the lower support member.

7. The wraparound support of claim 1, wherein the upper guide member has a prismatically shaped member extending away from the slide and the upper surface of the guide bar cooperating therewith is adapted to receive the prismatically shaped section.

8. The wraparound support of claim 7, wherein the bearing means in the upper guide member and the lower guide member are flat bearing elements.

9. The wraparound support of claim 8, wherein the intermediate support member includes a support section spaced apart from the side face of the guide bar for coupling the lower guide member and slide and a spacer portion adjacent to the side face of the guide bar formed with an opening therethrough, the spacer portion not supporting the slide and lower guide member whereby bending stresses leading to a distorted position of the guide element are avoided.

10. The wraparound support of claim 1, including a gap between the spacer portion of the intermediate support member and the lower guide member, the width of said gap being reduced by increased tensional force supplied by the tension screws.

* * * * *